United States Patent [19]

Shigeta

[11] 4,318,140
[45] Mar. 2, 1982

[54] VIDEO TAPE REPRODUCING APPARATUS WITH VARIOUS TAPE SPEEDS

[75] Inventor: Yasuo Shigeta, Yokohama, Japan

[73] Assignee: Sony Corporation, Tokyo, Japan

[21] Appl. No.: 78,762

[22] Filed: Sep. 25, 1979

[30] Foreign Application Priority Data

Sep. 26, 1978 [JP] Japan ................. 53-118249

[51] Int. Cl.³ ............... G11B 15/54; G11B 15/18; G11B 19/28
[52] U.S. Cl. .......................... 360/73; 360/10; 360/84
[58] Field of Search ............ 360/73, 10, 71, 72.2, 360/74.2, 84; 358/4, 8; 318/301, 305, 309–312, 318

[56] References Cited

U.S. PATENT DOCUMENTS

| | | | |
|---|---|---|---|
| 3,636,252 | 1/1972 | Kowal | 360/70 |
| 4,003,090 | 1/1977 | Beck | 360/73 |
| 4,123,773 | 10/1978 | Rotter et al. | 360/73 |
| 4,139,872 | 2/1979 | Tachi | 360/10 |
| 4,163,262 | 7/1979 | Kaemmerer | 360/73 |
| 4,163,993 | 8/1979 | Ravizza | 360/10 |
| 4,218,713 | 8/1980 | Horak | 360/80 |

Primary Examiner—Alfred H. Eddleman
Attorney, Agent, or Firm—Hill, Van Santen, Steadman, Chiara & Simpson

[57] ABSTRACT

In a video tape recorder, a video tape is advanced, at variable speeds other than the normal speed in order to search tape position for editing purpose, by observing the reproduced image on a monitor screen. A speed command signal is supplied to the video tape recorder in the form of a frequency signal. A capstan installed in the video tape recorder carries a frequency generator, and the tape speed is determined by directly comparing a frequency of the command signal with a frequency of a rotation signal obtained from the frequency generator.

12 Claims, 9 Drawing Figures

VIDEO TAPE REPRODUCING APPARATUS WITH VARIOUS TAPE SPEEDS

BACKGROUND OF THE INVENTION

1. Field of the Invention

This invention relates generally to a video tape recorder and particularly to a tape speed control system of the video tape recorder.

2. Description of the Prior Art

Recently, a helical scan video tape recorder (HVTR) is widely used even in a broadcasting field. The most important advantage of the HVTRs is that it is easy to play back in slow motion mode, stop motion mode, and fast motion mode even in a reverse motion mode. This is because the HVTRs record one field video signal in a single oblique track on the video tape.

In a prior art system, the command signal is supplied to the HVTR in the form of a DC potential. In such a prior art system, the speed of a video tape is not able to be controlled so precisely. Therefore, when the tape speed is required near the zero speed, the tape speed becomes unstable. When the tape is advanced near the zero speed in order to determine an edit point in the stream of scenes for the editing purpose, the unstable tape advance causes misdecision of the edit point.

OBJECTS AND SUMMARY OF THE INVENTION

Accordingly, an object of the present invention is to provide a novel helical scan video tape recorder (HVTR).

Another object of the invention is to provide a novel tape speed control system for the HVTR, which is very effective for controlling the tape speed of the HVTR when it is in a special reproducing mode such as still, slow or fast reproducing mode.

In the present invention, a command signal for the transferring speed of a video tape in a VTR is supplied as a frequency signal. While, at the side of the VTR there is provided a frequency signal generator such as a capstan FG (frequency generator) which generates a frequency signal corresponding to the speed of the video tape when a pinch roller is actuated. The speed of the video tape is controlled such that the frequency of the frequency signal from the capstan FG becomes equal to that of the command signal. In the normal reproducing mode, a capstan motor of the VTR has provided with a capstan servo loop by an external reference signal such as 60 $H_z$VD. The mode to which the present invention is applied is defined as a search mode, and the travelling speed of a video tape is determined by the capstan and actuated pinch roller under this search mode. This is the same as the normal reproducing mode, but the video tape varies at speeds of 0 to 5 times normal in the forward and reverse directions. In this case, the VTR is, of course, in the reproducing mode and video scenes can be discriminated on its monitor screen. The VTR further has FF (fast forward) mode and RWD (rewind) mode. At this time, the speed of the video tape is determined by a reel motor, because the pinch roller is deactuated. It is possible for the tape speed in the FF or REW mode to be controlled with the frequency of the command signal. In the FF and REW modes, the pinch roller does not engage the capstan and a reproducing circuit is not operated.

The present invention is especially suitable for a VTR used in an editing system. When an editing point is determined, it is sufficient that the VTR is put in the search mode and a manually variable frequency oscillator is controlled. For the phase matching of the tape upon actually carrying out the editing, a command signal with a variable frequency is produced by an editing controller.

The other objects, features and advantages of the present invention will become apparent from the following description taken in conjunction with the accompanying drawings.

DESCRIPTION OF THE PREFERRED EMBODIMENTS

The present invention will be hereinafter described with reference to the attached drawings.

Figure 1:
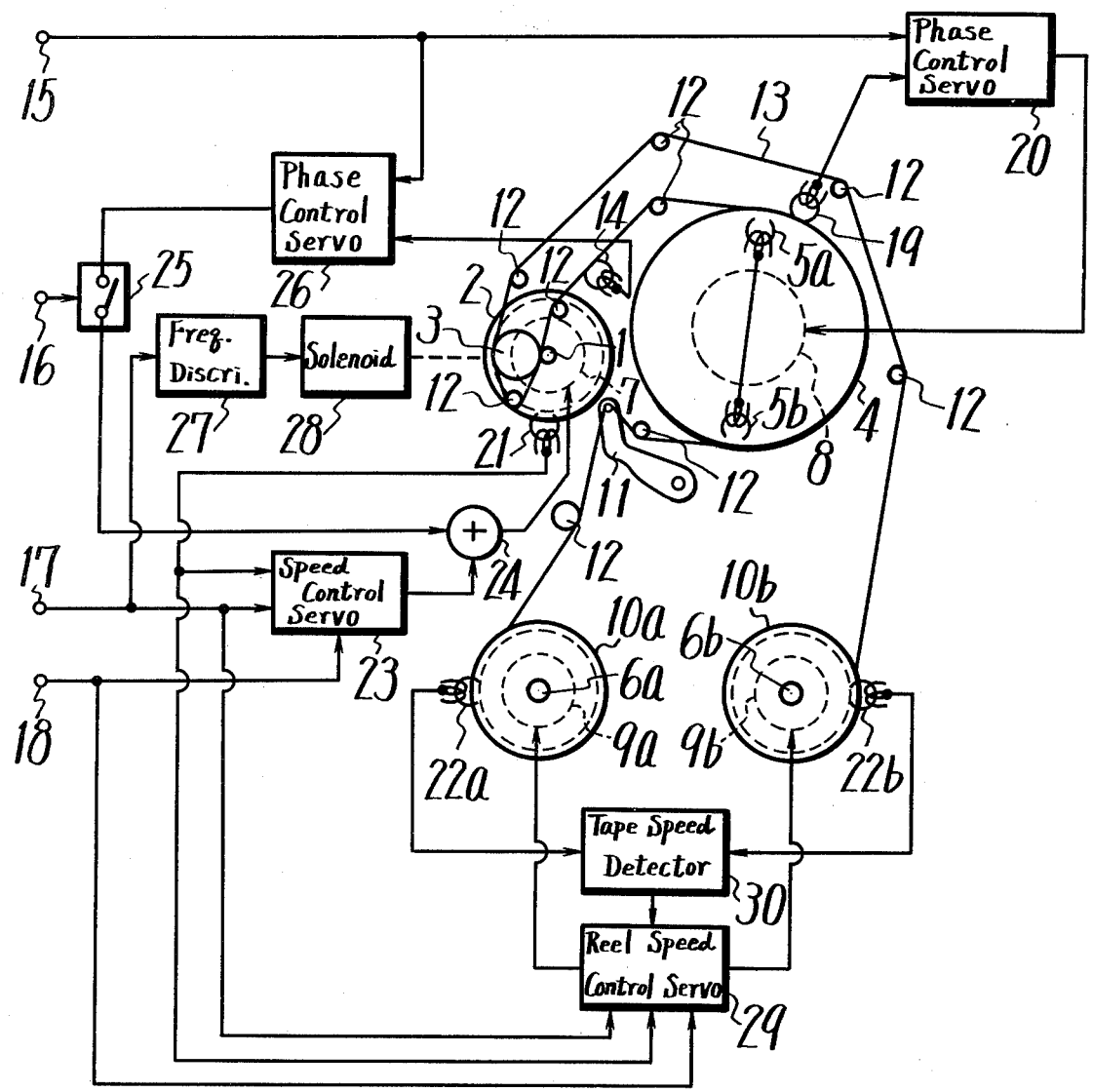
FIG. 1 is a schematic diagram showing the main part of a 2-head helical scan video tape recorder to which the present invention is applied.

As shown in FIG. 1, the present invention can be applied to a 2-head type helical scan video tape recorder (HVTR). In the 2-head type HVTR, two heads alternately scan a magnetic video tape in an oblique direction to record a video signal on the video tape such that the video signal of one field is recorded on the video tape as one track. Such kind of VTR is well known, for example, as a U-matic system (Trade marks of SONY CORP.), which uses a ¾inch tape, so that its detailed description will be omitted. FIG. 1 shows only the main part of the 2-head HVTR.

In FIG. 1, 1 designates a capstan to which a fly-wheel 2 is attached. A pinch roller 3 can be in contact with the capstan 1. To a rotary drum or disc 4 there are attached a pair of magnetic heads 5a and 5b (the rotary drum or disc will hereinafter be simply referred to as a drum). Reel shafts 6a and 6b are provided. In this case, it is assumed that the reel shaft 6a is taken as a supply reel shaft while the reel shaft 6b is taken as a take-up reel shaft, respectively. In the example of FIG. 1, drive motors 7, 8, 9a and 9b are directly coupled to the capstan 1, drum 4 and reel shafts 6a, 6b, respectively. Tape reels 10a and 10b are engaged with the reel shafts 6a and 6b, respectively. In FIG. 1, 11 designates a tape tension regulator, 12 designates tape guides, 13 denotes a video tape, and 14 represents a CTL head (for a 30 $H_z$ control signal), respectively.

Further, in FIG. 1, 15 designates an input terminal to which an external synchronizing signal is applied. When a television signal is recorded or an electronic edition is carried out, an external synchronizing signal of 30 $H_z$, which is synchronized with the vertical synchronizing signal in a video signal to be recorded, is applied to the input terminal 15. In this case, the synchronizing signal of 30 $H_z$ fed to the terminal 15 and the rotary signal of 30 $H_z$ generated from a pulse generator 19 in response to the rotation of the drum 4 are phase-compared by a phase control servo circuit 20 whose error output is applied to the motor 8 for the drum 4 to control its rotary phase, which is known.

In FIGS. 1, 16, 17 and 18 designate input terminals to which command signals are supplied from the outside or controller provided outside (not shown). That is, the input terminal 16 is supplied with a command signal for the normal play, the input terminal 17 is supplied with a speed command frequency signal for varying the transporting speed of the tape 13, and the input terminal 18 is supplied with a reverse command signal for changing the transporting direction of the tape 13, respectively.

In connection with the capstan 1, there is provided a frequency generator (which will hereinafter be referred to as a capstan—FG) 21 for detecting the rotating speed of the capstan 1. Further, in the illustrated example in FIG. 1, in order to detect the transporting speed of the tape 13, in connection with the reel shafts 6a and 6b, there are provided frequency generators which will hereinafter be referred to as reel—FGs 22a and 22b, respectively. These capstan-FG 21 and reel-FGs 22a and 22b are known, so that their detailed description will be omitted. Further, the transporting speed of the tape 13 can be known by such a manner that a roller is provided in direct contact with the tape 13 and its rotating number is measured, or a CTL head (tracking control head) 14 is provided to reproduce CTL pulses from the tape 13 and the pulse distance thereof is detected, instead of using the above-mentioned FGs.

In the example of the invention shown in FIG. 1, the operation modes in connection with the tape transportation may be described as follows. The normal play, search play and still play are defined as the playback mode. The playback mode is generally provided so as to watch a reproduced video signal on a monitor screen. At this time, the tape 13 is transported by the capstan 1. The normal play corresponds to the normal tape transporting speed and at this time the capstan motor 7 is subjected to the speed control servo and also phase control servo operations. The search play includes the reverse play and forward play each of which includes the slow and fast modes. When the tape speed is faster than that of the search play, the tape is merely advanced by the reel motor. In the mode, there are defined fast forward and rewind modes in accordance with the tape transporting direction. In this case, the pinch roller 3 is, of course, not actuated.

Figure 2:
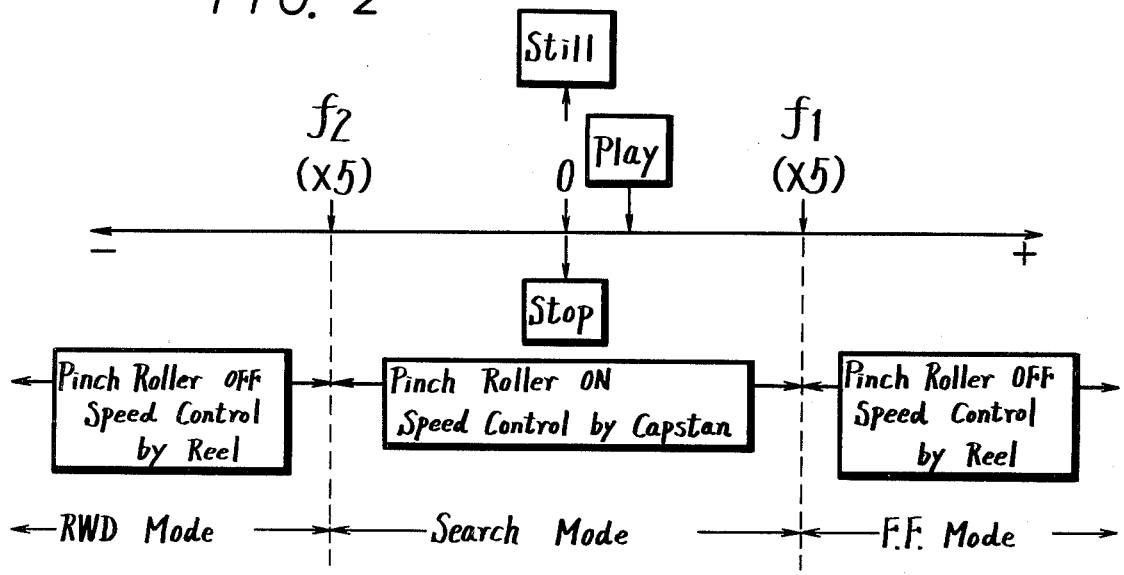
FIG. 2 is a mode chart of the video tape recorder shown in FIG. 1.

FIG. 2 shows the chart of the above modes, in which $\times 5$ to $-\times 5$ speeds are taken as the search mode.

Further, in the example of FIG. 1, the mode is automatically changed from the search mode to FF or REW mode by only discriminating the frequency of the speed command signal fed to the input terminal 17. However, only in the case of the normal play, the control signal is applied from the outside. In the normal play mode, a rotational pulse of 300 $H_z$ is to be generated from the capstan -FG21. In this case, the speed command frequency signal of 300 $H_z$ is applied to the input terminal 17 to control the rotational speed of the capstan -FG 21. To this end, there is provided a speed control servo circuit 23, which is supplied with the capstan rotational pulse from the capstan -FG 21 and the speed command frequency signal from the input terminal 17 and compares frequencies of both the signals. The resultant compared signal from the speed control servo circuit 23 is supplied through an adding circuit 24 to the capstan motor 7 to achieve the rotational speed control of the capstan motor 7 based upon this compared output.

Also, upon the normal play, the normal play signal from the controller is applied through the input terminal 16 to a switching circuit 25 to make it ON. While the vertical synchronizing signal through the input terminal 15 and the CTL pulse from the CTL head 14 are supplied to a phase control servo circuit 26 whose compared output is fed through the switching circuit 25 (which is in ON-state) and the adding circuit 24 to the capstan motor 7 to control the rotational phase of the capstan 1 simultaneously. Thus, upon the normal play, the capstan 1 is driven under a speed-controlled by the speed of command frequency signal applied to the input terminal 17 and phase-controlled by the signal from the phase control servo circuit 26 to control the transportation of the tape 13.

In the normal playback mode, the speed command frequency signal fed to the input terminal 17 is applied to a frequency detecting circuit such as a frequency discriminator 27 and its frequency is discriminated thereby. This frequency discriminator 27 applies its output signal to an urging means for the pinch roller 3 such as a solenoid 28 to contact the pinch roller 3 with the capstan 1 when the frequency of the speed command frequency signal is in the range of $+f_1$ to $-f_2$. In the normal playback mode, the frequency 300 $H_z$ is within the frequency range of $+f_1$ to $-f_2$, and accordingly, the speed of the tape 13 is determined by the contact of the pinch roller 3 with the capstan 1.

The reverse command signal applied to the input terminal 18 is supplied to the speed control servo circuit 23 and also to a reel speed control servo circuit 29. The output signal therefrom is supplied to the reel motors 9a and 9b for the reel shafts 6a and 6b, respectively, the drive the motor 9b of the reel shaft 6b when the tape 13 is to be transported in the forward direction, while to supply the current to the other motor 9a for causing the back tension. When the tape 13 is to be transported in the opposite or reverse direction, the operation opposite to the above is performed. In this case, in order that the tape 13 may be transported in the forward direction when the reverse command signal is, for example, "1" while the tape 13 may be transported in the opposite direction when the reverse command signal is "0" (or "−1"), in the servo circuits 23 and 29 there are respectively provided reverse switches.

The frequency signals from the reel shaft-FGs 22a and 22b are supplied to a tape speed detector 30, from which there is obtained a signal (for example, pulse) having the frequency corresponding to the tape transporting speed in the fast forward and rewind modes. This signal from the detector 30 is supplied to the reel speed control servo circuit 29 which is also supplied with the speed command frequency signal from the input terminal 17 and with the frequency signal from the capstan -FG21. Thus, this servo circuit 29 includes a frequency comparing circuit. In this case, it is known in the art that the frequency signals from the reel -FGs 22a and 22b can be applied to the tape speed detector 30 to detect the tape speed.

Figure 3:
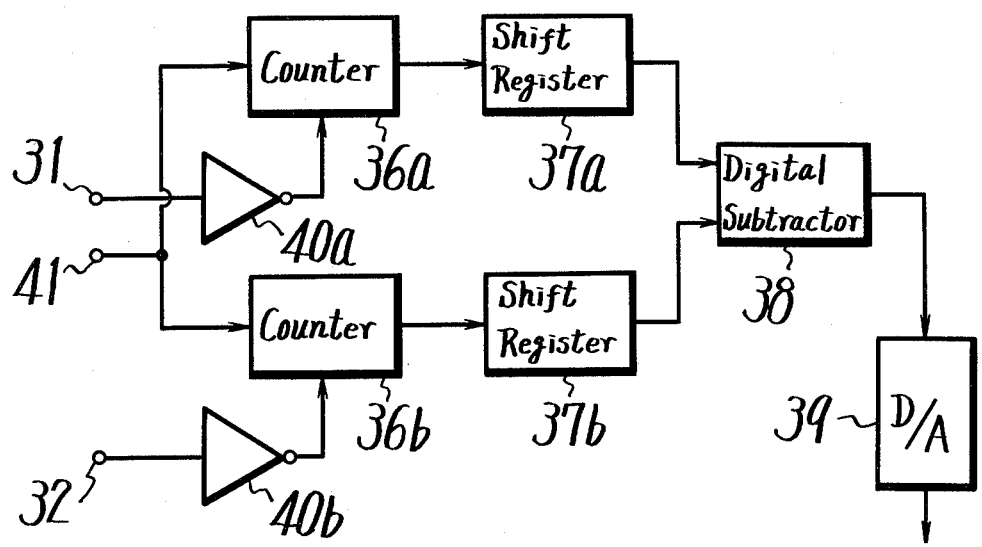
FIG. 3 is a block diagram showing an example of the frequency comparator used in the present invention.
Figure 4A:
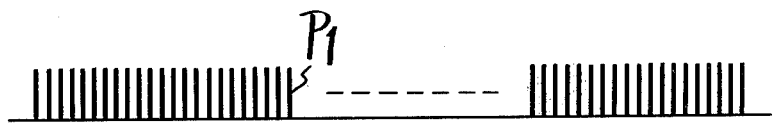
FIG. 4A to FIG. 4E are time charts used for explaining the operation of the frequency comparator shown in FIG. 3.

FIG. 3 shows an example of the frequency comparing circuit which can be used in the servo circuits 23 and 29. As shown in FIG. 3, the frequency comparing circuit comprises a pair of counters 36a, 36b and a pair of shift registers 37a, 37b which are supplied with the outputs from the counters 36a, 36b. The outputs from the shift registers 37a and 37b are fed to a digital subtractor 38 serving as a comparator, which then produces a frequency signal corresponding to the difference between the outputs from the shift registers 37a and 37b. This frequency signal from the digital subtractor 38 is supplied to a D/A (digital to analog) converter 39. A clock pulse $P_1$ shown in FIG. 4A is applied through an input terminal 41 to the counters 36a and 36b which are also supplied, at the clear terminals thereof, with signals having the frequencies of $F_1$ and $F_2$ through terminals 31, 32 and through phase inverting circuits 40a and 40b, respectively.

Figure 4B:
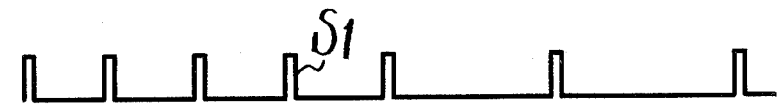
Figure 4C:
Figure 4D:
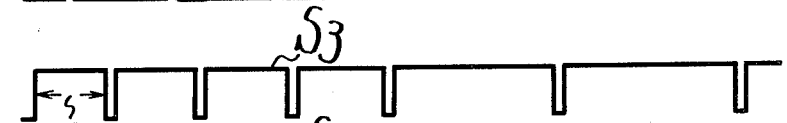
Figure 4E:
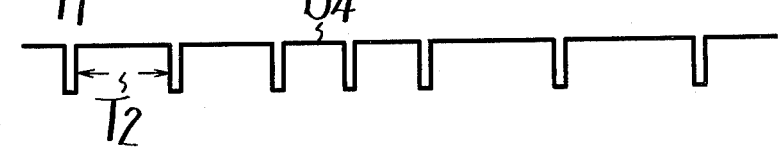

Now, the operation of the circuit shown in FIG. 3 will be described with reference to FIGS. 4A to 4E. Signals $S_1$ and $S_2$ shown in FIGS. 4B and 4C are applied to the terminals 31 and 32 and then to the phase inverters 40a and 40b. Thus, the signals $S_1$ and $S_2$ are phase-inverted by the inverters 40a and 40b as shown in FIGS. 4D and 4E, which are marked at $S_3$ and $S_4$, respectively. Thus, the clock pulse $P_1$ is sequentially counted by the respective counters 36a and 36b during periods $T_1$ and $T_2$ of the signals $S_3$ and $S_4$ and then sequentially memorized in the shift registers 37a and 37b, respectively. The read-out signals from the shift registers 37a and 37b are compared in the digital subtractor 38. Therefore, the frequency difference between the signals $S_1$ and $S_2$ applied to the terminals 31 and 32 is known by the compared output from the digital subtractor 38.

In the example of FIG. 3, it is possible that the output from the capstan -FG 21 is applied to the terminal 31 and the speed command frequency signal from the input terminal 17 is applied to the terminal 32 or vice versa. It is also possible that the output from the tape speed detector 30 can be supplied to the terminal 31 and the speed command frequency signal from the terminal 17 is fed to the terminal 32 or vice versa.

Figure 5:
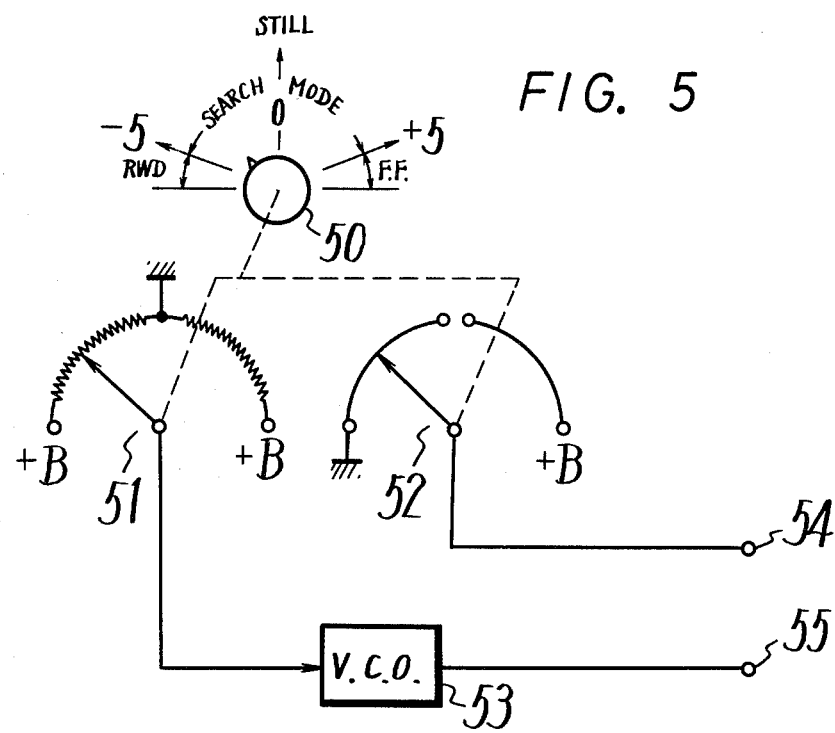
FIG. 5 is a schematic diagram showing an example of a control device which is used to manually control the video tape recorder shown in FIG. 1.

The operation of the VTR shown in FIG. 1 will be now described. It is assumed first that two of the VTRs shown in FIG. 1 are used, the terminals 15 to 18 of each of the VTRs are connected to the controller, and a reproducing output terminal of one of the VTRs is connected to an input terminal of the other VTR to achieve the electronic editing. In this case, it is also assumed that the time code signals for address are previously recorded on video tapes of the respective VTRs, these time code signals are detected by separate heads (not shown) as the tapes are transported, and then fed to the controller. In the controller, there is provided a control knob 50 such as shown in FIG. 5. This control knob 50 is ganged with a potentiometer 51 and a rotary switch 52. A voltage controlled oscillator 53 is connected to the potentiometer 51 whose output is supplied through a terminal 55 to the terminal 17 as the speed command frequency signal. The rotary switch 52 produces a voltage "1" or "0" at a terminal 54 with its mid point as the boundary. This voltage "1" or "0" at the terminal 54 is then applied to the terminal 18 as the forward-reverse command signal.

Upon the editing of a video tape, the first work to be carried out is to find an editing point. It is the most effective utilization of the present invention that the editing point is rapidly and positively found by adjusting the control knob 50 while watching a scene on the monitor screen. At this time, it is possible to select the forward play, reverse play, fast forward mode or rewind mode by adjusting only the control knob 50.

When the control knob 50 is rotated to the position shown in FIG. 5, the tape 13 is transported in the reverse direction at about 3-time speed. At this time, the "0" potential is produced at the terminal 54 and the speed command frequency signal with the frequency of about 900 $H_z$ (= 300 $H_z \times 3$) is delivered to the terminal 55. Thus, the time code signals corresponding to all the editing points are memorized on a memory (not shown) in the controller.

After all editing points are decided, the edigint controllers are all controlled by the computer program control and its practical editing work is carried out automatically. Then, the practical editing operation will be now described. In this case, address pointing signals (time code signals) for the reproducing side (one) and recording side (the other) VTRs are read out from the memory of the controller, the signal of "1" or "0" is supplied to the terminals 18 of the respective VTRs in accordance with whether the tapes 13 of the respective VTRs are transported in the forward or reverse direction, and in order to change the transporting speeds of the tapes 13 depending upon how much the position or address of the appointed time code signals on the tapes are apart or remote from the present positions, the corresponding frequency signals are supplied to the input terminals 17 of the VTRs.

When in one VTR the appointed address by the controller is at a position near the end of the tape 13, the tape 13 of this VTR must be transported at high or fast speed in the forward direction. Thus, in this case, the signal with a high frequency is supplied to the input terminal 17, the signal "1" is supplied to the input terminal 18, and the signal "0" is supplied to the terminal 16. Thus, the switching circuit 26 turns OFF.

Under the above state, the current is applied to the reel motor 9b to take up the tape 13 on the reel 10b. At this time, the tape speed is detected by the tape speed detector 30 and the output therefrom is supplied to the reel speed control servo circuit 20 which is also supplied with the signal of the high frequency from the input terminal 17. Thus, servo circuit 29 detects the difference between both the signals and the motor 9b is driven based upon the above difference. As a result, the tape 13 is transported at the speed corresponding to the frequency of the signal supplied to the terminal 17 in the FF mode. That is, in this case, the tape 13 is transported at the high speed.

In this case, the highest transporting speed of the tape 13 can be selected to be 30 times the normal speed (ordinary recording and reproducing speed) of the tape 13. Further, the frequency of the signal applied to the input terminal 17 is detected by the frequency discriminator 27. When the detected frequency is in the range of $+f_1$ to $-f_2$, the pinch roller 3 is placed in contact with the capstan 1 as set forth above. This frequency range is previously selected to correspond to the frequency range in which the transporting speed of the tape 13 is 5 times the normal speed. Thus, when the tape 13 is transported at a high speed as described above, the pinch roller 3 is moved apart from the capstan 1 and the transporting speed of the tape 13 is determined by the rotation speed of the reel motor 9b. In the above manner, the tape 13 is transported at high speed. When the appointed address comes near, the frequency of the signal applied to the speed command terminal becomes lower and hence the tape transporting speed becomes correspondingly lower. When the tape speed nears the normal speed and has fallen within the range of about 5 times the normal speed, the pinch roller 3 comes into rotary contact with the capstan 1. Thus, the transporting speed of the tape 13 is determined by the capstan 1.

Under this state, the frequencies of the signal from the capstan-FG 21 and speed command signal from the terminal are compared in the speed control servo circuit 23 and the capstan motor 7 is driven by the output from the servo circuit 23. Therefore, similar to the foregoing, the transporting speed of the tape corresponds to the speed command signal.

The reason why, when the tape speed is low, the tape 13 is transported by the capstan 1 is that as the tape speed becomes low, its load increases and hence it is impossible to smoothly transport the tape 13 by only the reel motor 9b (or 9a). For this reason, the tape 13 is transported by the capstan 1 which has great drive torque when the tape speed is low. Further, the reason why the tape speed by the capstan 1 is selected in the range of 5 times the stationary speed is that this speed range includes the slow play and still play, and almost all reproduced pictures can be discriminated.

The above description is given for transporting the tape 13 in the forward direction, but the transportation of the tape 13 in the opposite or reverse direction can be carried out by similar operation. In this case, it will be apparent that the motor 9a is driven and the capstan motor 7 is rotated in the opposite direction.

Further, the above description is for the operation of the reproducing VTR, but it will be apparent that the recording VTR can be similarly controlled by the command signal from the controller.

According to the present invention described as above, the transporting speed of the tape 13 from low to high speeds can be accurately searched as the frequency signal, so that the transporting speed of the tape 13 can be accurately controlled by the speed command or frequency signal supplied to the input terminal 17 and this can be searched. In addition, since the transporting speed of the tape 13 is controlled by the frequency, the tape speed can be desirably varied from 0 to a high speed.

As shown in the example, when the tape speed is relatively low, the tape 13 is transported by the capstan 1. Therefore, the tape 13 can be transported stably and hence a reproduced picture may be discriminated.

Further, in the example of the invention since 5 times normal speed is selected as limits in both the forward and reverse directions of the search mode, it is sufficient to select $f_1 = f_2 = 1500$ Hz. However, it is not always necessary to change the search mode from the FF or RWD mode by automatic discrimination, but is may be possible to apply the mode signal from the outside. Further, the tape 13 is merely transported at a constant speed during the FF and RWD modes.

It will be apparent that many modifications and variations could be effected by one skilled in the art without departing from the spirit or scope of the novel concepts of the present invention, so that the scope of the invention should be determined by the appended claims only.

I claim as my invention:

1. Video tape reproducing apparatus with various tape speeds such as slow, fast, reverse slow and reverse fast modes, comprising:
    (a) helical scan rotary magnetic heads for scanning oblique video tracks on a video tape;
    (b) a capstan and pinch roller assembly for advancing said video tape at various tape speeds in both forward and reverse directions;
    (c) a rotation pulse generator for generating rotation pulses indicative of the rotational speed of said capstan;
    (d) means for applying a variable frequency command signal which has a frequency indicative of the command speed which can be other than normal speed control commands;
    (e) a frequency comparator for detecting the frequency difference between said rotation pulses and said command signal; and
    (f) a capstan drive circuit including means for controlling the rotational speed of said capstan in response to the detected output of said frequency comparator.

2. Video tape reproducing apparatus as claimed in claim 1, wherein said command signal further includes direction command information and wherein said capstan drive circuit changes the rotational direction in response to said direction command information.

3. Video tape reproducing apparatus as claimed in claim 1, wherein said frequency information of said command signal is generated by adjusting a potentiometer which is connected to a voltage controlled oscillator.

4. Video tape reproducing apparatus as claimed in claim 3, wherein said direction command information of said command signal is generated in synchronism with said potentiometer.

5. Video tape reproducing apparatus as claimed in claim 4, wherein said potentiometer is so formed that it produces substantially the same potentials with its mid point as a boundary and said direction command signal generates a forward or reverse command with the mid point as the boundary.

6. Video tape reproducing apparatus as claimed in claim 1, wherein said video tape is transported between a pair of reels, each of said reels having a drive circuit, and said capstan and pinch roller assembly being actuated by a solenoid.

7. Video tape reproducing apparatus as claimed in claim 6, further comprising a frequency discriminating circuit which detects said frequency information of said command signal or frequency of said rotation pulse, and when the detected frequency exceeds a predetermined frequency, said solenoid deactuates said capstan and pinch roller assembly.

8. Video tape reproducing apparatus as claimed in claim 7, wherein rotational pulse generators are provided in connection with said reels respectively, and a tape speed detector is provided for calculating a tape speed based upon outputs from said generators, whereby when said capstan and pinch roller assembly is de-actuated, said reel drive circuits are controlled by a compared result between said frequency information of said command signal and the outputs from said tape speed detector to thereby control the tape speed.

9. A video tape reproducing apparatus with various tape speeds such as slow, fast, reverse slow and reverse fast modes comprising:
    (a) a video tape, a capstan and pinch roller assembly;
    (b) means for advancing said tape in both forward and reverse directions;
    (c) rotary magnetic heads for helically scanning oblique video tracks on said tapes;
    (d) a rotation pulse generator including means for generating rotational pulses indicative of the rotational speed of said capstan;
    (e) means for applying a variable frequency command signal which has a frequency indicative of the command speed which can be other than normal speed control commands;

(f) a frequency comparator for detecting the frequency difference between said rotation pulses and said command signal; and (g) a capstan drive circuit including means for controlling the rotational speed of said capstan in response to the detected output of said frequency comparator.

10. Video tape reproducing apparatus as claimed in claim 9, which includes a voltage controlled oscillator, a potentiometer connected to said oscillator, and wherein said frequency of said command signal is generated by adjusting said potentiometer.

11. Video tape reproducing apparatus as claimed in claim 9, wherein said direction command information of said command signal is generated in synchronism with said potentiometer.

12. Video tape reproducing apparatus as claimed in claim 11, which includes a pair of tape reels between which said tape is transported, each of said reels having a drive circuit and said capstan and pinch roller assembly being actuated by a solenoid.

* * * * *